(12) United States Patent
Kabra et al.

(10) Patent No.: US 11,893,258 B2
(45) Date of Patent: Feb. 6, 2024

(54) OFFLOADED DATA MIGRATION BETWEEN STORAGE DEVICES

(71) Applicant: Seagate Technology LLC, Fremont, CA (US)

(72) Inventors: Nitin Kabra, Pune (IN); Sneha Wagh, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/736,020

(22) Filed: May 3, 2022

(65) Prior Publication Data

US 2022/0261172 A1   Aug. 18, 2022

Related U.S. Application Data

(63) Continuation of application No. 16/272,390, filed on Feb. 11, 2019, now Pat. No. 11,334,274.

(60) Provisional application No. 62/628,678, filed on Feb. 9, 2018.

(51) Int. Cl.
*G06F 3/06* (2006.01)
*G06F 12/0893* (2016.01)
*G06F 13/16* (2006.01)
*G06F 12/0868* (2016.01)

(52) U.S. Cl.
CPC ............ *G06F 3/0649* (2013.01); *G06F 3/068* (2013.01); *G06F 3/0616* (2013.01); *G06F 3/0659* (2013.01); *G06F 3/0679* (2013.01); *G06F 12/0868* (2013.01); *G06F 12/0893* (2013.01); *G06F 13/1673* (2013.01); *G06F 2212/222* (2013.01); *G06F 2212/312* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 6,839,804 B2 | 1/2005 | Don et al. | |
| 7,318,118 B2 | 1/2008 | Chu et al. | |
| 7,577,729 B1 | 8/2009 | Umbehocker et al. | |
| 10,091,295 B1 | 10/2018 | Savic et al. | |
| 2001/0044879 A1 | 11/2001 | Moulton et al. | |
| 2003/0187853 A1 | 10/2003 | Hensley et al. | |
| 2006/0004957 A1 | 1/2006 | Hand et al. | |
| 2013/0132638 A1 | 5/2013 | Horn et al. | |

(Continued)

FOREIGN PATENT DOCUMENTS

CN   105808150 A   7/2016

OTHER PUBLICATIONS

Seagate Technology LLC, "Seagate 12G Hybrid 4005," Seagate.com, 2017, 2 pages.

(Continued)

*Primary Examiner* — Michael Alsip
(74) *Attorney, Agent, or Firm* — HOLZER PATEL DRENNAN

(57) ABSTRACT

A method disclosed herein includes storing a data heat map in local cache of a non-volatile memory express (NVME) controller associated with an NVME device, configuring an asynchronous event notification command in a submission queue associated with the NVME device, generating a request for data migration notification to host based on the data heat map, and communicating the data migration notification to a host using the asynchronous event notification command.

20 Claims, 8 Drawing Sheets

(56) References Cited

U.S. PATENT DOCUMENTS

| | | |
|---|---|---|
| 2014/0207996 A1 | 7/2014 | Fisher et al. |
| 2015/0234595 A1 | 8/2015 | Satou |
| 2016/0042005 A1 | 2/2016 | Liu et al. |
| 2016/0077974 A1 | 3/2016 | Kim et al. |
| 2016/0179683 A1 | 6/2016 | Chen et al. |
| 2016/0328347 A1 | 11/2016 | Worley et al. |
| 2017/0060764 A1 | 3/2017 | Shetty et al. |
| 2017/0104840 A1 | 4/2017 | Spagnola et al. |
| 2017/0371566 A1 | 12/2017 | Zhou |
| 2018/0136838 A1 | 5/2018 | White et al. |

OTHER PUBLICATIONS

Seagate Technology LLC, "The Seagate Kinetic Open Storage Vision," Seagate.com, 2018, 6 pages.

"Real-Time Storage Tiering for Real-World Workloads", Dot Hill Systems, Dot Hill Systems White Paper, 2012, 10.

"The Architectural Advantages of Dell SC Series Automated Tiered Storage", Dell Engineering, A Dell Technical White Paper 3133-WP-SC, Jan. 2016, 17.

Evans, Chris , "Top Five Things to Know About Flash and Storage Tiering", ComputerWeekly.com, Nov. 26, 2015, 3.

Freeman, Larry , "What's Old Is New Again—Storage Tiering", NetApp, Inc., SNIA Tutorial, Storage Networking Industry Assoc., 2012, 23.

Oh, Yongseok , et al., "Caching less for better performance: Balancing cache size and update cost of flash memory cache in hybrid storage systems", USENIX, 10th USENIX Conference on File and Storage Technologies, Feb. 17, 2012.

Wilkinson , et al., "Storj A Peer-to-Peer Cloud Storage Network", Storj tutorial, Dec. 15, 2016, 37.

OFFLOADED DATA MIGRATION BETWEEN STORAGE DEVICES

CROSS-REFERENCE TO RELATED APPLICATIONS

The present application is a Continuation of non-provisional patent application Ser. No. 16/272,390 which was filed on Feb. 11, 2019, entitled "Offloaded Data Migration Between Storage Devices" and claims priority from and benefit of U.S. Provisional Application Ser. No. 62/628,678 filed on Feb. 9, 2018, which is incorporated herein by reference in its entirety.

BACKGROUND

In today's data storage infrastructure different type of storage devices such as hard disk drive (HDD), solid state drive (SSD), solid-state hybrid drive (SHDD) etc. are used to store the data. These different types of drive uses different storage interconnect e.g. serial advanced technology attachment (SATA), serial attached SCSI (SAS), fiber channel (FC), and peripheral component interconnect express (PCIE), etc. Capacity of the SSD drive becomes a concern when most of the storage capacity gets utilized in storing the cold data. To optimize the overall storage access performance and to provide the cost effective solution, data needs to be transferred from one type of storage device to other. The process is called as "Data Migration" where Hot or Warm data mainly needs to be stored in SSD drive for fast user access and Cold or less recently used data needs to be stored in Hard Disk Drive. In non-volatile memory express (NVME) HDD drives, HDD storage is interfaced using embedded SATA interconnect within drive and host is interfaced using PCIE interconnect at drive's host connector.

Implementations of SHDD may be configured as NVME Hybrid drives that combines flash storage and hard disk storage with the intent of storing frequently used data in flash storage and cold or less accessed data in hard disk storage. When the data is migrated from the flash storage to hard disk storage, the process is called as "demotion of data" and when the data is migrated from hard disk storage to flash storage, the process is called as "promotion of data". This process can happen within a single SHDD drive or between two drives (SSD and SSD/HDD).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a method includes generating attestation information associated with a storage device. The attestation information represents a status of the storage device. The method further includes storing a data heat map in local cache of a non-volatile memory express (NVME) controller associated with an NVME device, configuring an asynchronous event notification command in a submission queue associated with the NVME device, generating a request for data migration notification to host based on the data heat map, and communicating the data migration notification to a host using the asynchronous event notification command.

These and various other features and advantages will be apparent from a reading of the following Detailed Description.

BRIEF DESCRIPTIONS OF THE DRAWINGS

DETAILED DESCRIPTION

In storage infrastructure which uses NVME SSDs and SATA HDDs only, one still has to go through SAS infrastructure to talk to SATA drives. This involves 3 levels of protocol conversions i.e. from PCIe <>SAS <>SATA which not only adds additional latency to access the SATA storage but also increase the storage infrastructure cost.

In a datacenter which has all NVME drives (SSD, HDD, or SHDD) NVME, data movement between the drives still have to go through NVME HOST as host first copies data from one drive to its local memory and then write this data to other drive wasting host compute and hardware resources for the data migration task. Often host to drive data path needs to be overprovisioned for this reason as primary user traffic is also going through the same path. This also underutilizes the available PCIE peer to peer link bandwidth on each drive as host at any point of time may be talking to few drives in the storage network. However data migration between drives is almost ongoing all the time. Therefore, wasting host resources for such task is gross underutilization of overall PCIE bandwidth in a PCIE fabric.

Implementations disclosed here enable drives within NVME storage fabric infrastructure to talk to each other for migrating data among each other within standard NVME framework while still providing full host control where host is offloaded from the data migration task by utilizing peer to peer PCIe transfers and idle bandwidth available at each drive. This relieves host from actual data migration and associated hardware overprovisioning cost in entire storage infrastructure, while at the same time preserving the control of host on setting up data migrations such that no management/security/critical aspect of storage system is compromised.

Specifically, the implementations disclosed herein provide data migration under the NVME framework that uses PCIE topology with the help of PCIE switches where aggregation capability is provided to connect more than one storage devices to an NVME host. In one implementation, the PCIE switches may act as data router elements and recognize which path a given transaction layer packet will need to take based on its memory address or other routing information. Specifically, the implementations disclosed herein provide a simple, inexpensive, and homogeneous storage system using variants of NVME Drives. In the disclosed implementation, the data migration may be done well within standardized NVME Command sets. The commands which are not currently defined within NVME framework and called vendor defined commands are defined herein and may be made open source for wider industry adaptability.

Figure 1:
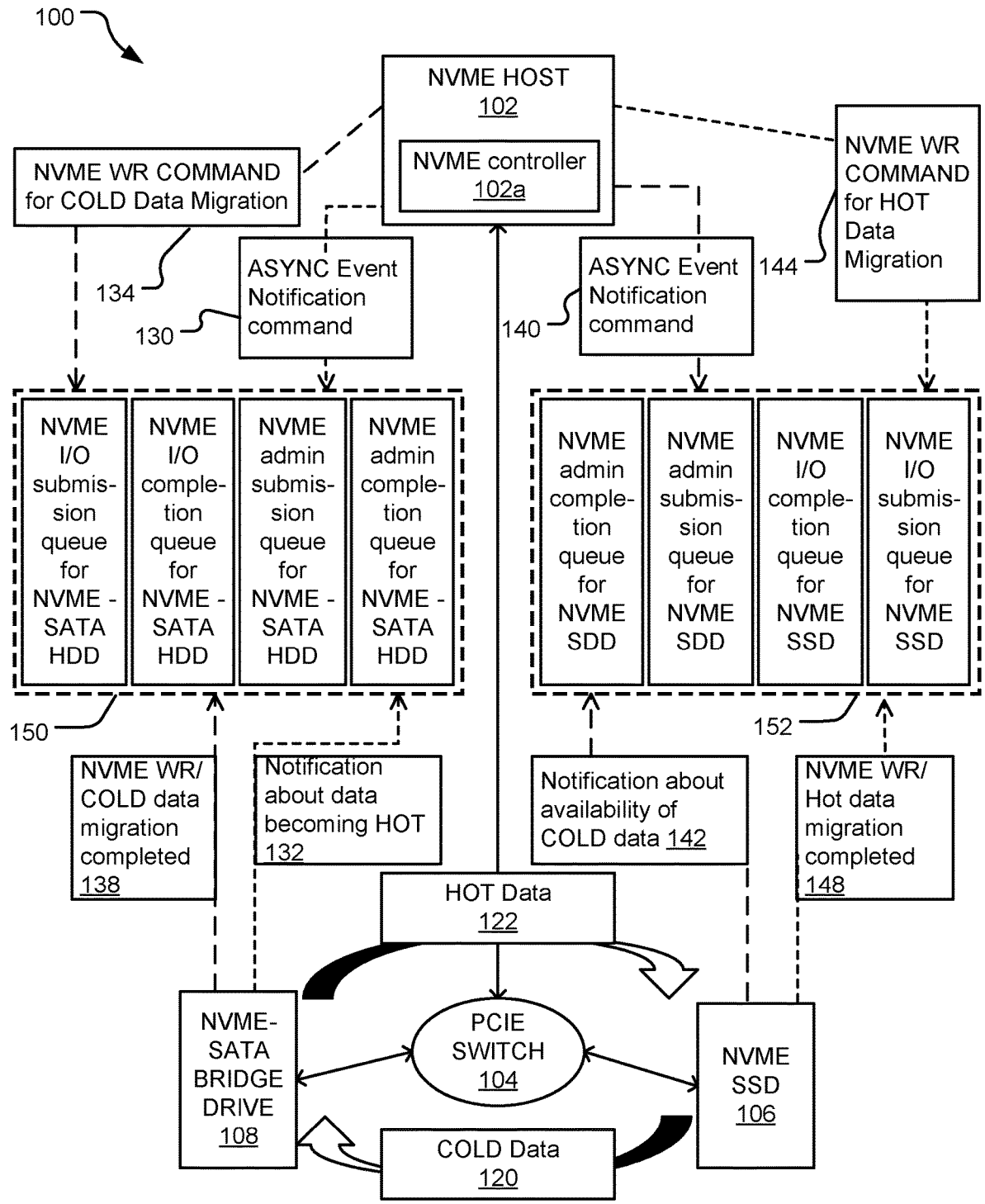
FIG. 1 illustrates an example block diagram of NVME queue creation for data migration as disclosed herein.

An implementation of a data migration solution disclosed in FIG. 1 may be the data migration use case between two NVME drives, between an NVME SSD 106 (also referred to as the NVME Flash drive 106) and an NVME-SATA bridge drive 108 (also referred to as the SATA HDD 108). Specifically, FIG. 1 illustrates an example block diagram 100 of NVME queue creation for data migration as disclosed herein. NVME is based on a paired submission and completion queues 150, 152. Commands are placed by host software into a submission queues associated to an NVME Controller 102a of an NVME host 102. Completions are placed into the associated completion queue by the NVME controller 102a. The NVME host 102 creates the paired submission and completion queues 150, 152, up to the maximum supported by the NVME controller 102a. Typically, queues are located in memory of the NVME host 102. The physical memory location that is used for data transfers are specified using physical region page (PRP) entries or scatter gather lists. Commands related to data migration are passed to the submission queues associated with the NVME drives 106, 108. Upon completion of the data migration, the drives 106, 108 update the NVME host 102 by posting completion in the associated completion queue.

NVME drives 106, 108 implement the core memory buffer feature in NVME which can be used for data migration purpose between two drives. One drive sees another drive's core memory buffer space as PRP region which is accessed through a PCIE switch 122. With this mechanism; buffer resources already available in any drives 106, 108 could be efficiently used during data migrations thus relieving critical memory and compute resource on the host side for user application and associated user data traffic.

Map of the Cold/Hot/Warm data 120 122 is stored by NVME Controller 102a in its local cache that triggers the need of data migration notification to NVME host 102. In one implementation the NVME controller 102a programs the asynchronous event notification command in the submission queues 150, 152 associated with NVME drives 106, 108 so that a drive 106, 108 can notify the NVME host 102 about availability of Cold/Hot/Warm data 120, 122—as illustrated by 132, 142. Specifically, the drives 106, 108 may notify the NVME host 102 about cold/hot/warm cache conditions through vendor defined asynchronous notifications and the associated LBA range and timestamp value that tells how old the data is.

In one implementation, the NVME host 102 programs an NVME Write command for cold data migration 134 and an NVME Write command for cold data migration 144 in the submission queues 150, 152 associated with drives 106, 108 (or any destination drive where data will rest after migration) in which archival/cold data needs to be stored. Data that needs to be archived is first copied in core buffer of the NVME SSD 106 and can be further sent to NVME SATA bridge drive 108 through the PCIE Switch 104.

Once the cold data migration is done as illustrated by 138 or a hot data migration is completed as illustrated by 148, completion of NVME write operation is submitted by NVME SATA bridge drive 108 to respective completion queue 150 in host system memory. The NVME host 102 loads number of sequential write commands in NVME HDD submission queue 150 to satisfy the entire cold data archival process. In such an implementation, the host may not do physical data movement but still be in control/in charge of data migration process.

When the archived data from the slower NVME SATA bridge drive 108 is getting read out by the NVME host 102, notification about data becoming HOT is sent to NVME host 102 through a vendor defined asynchronous event commands 130, 140 and data migration to a faster NVME SSD 106 is managed in the similar manner. The core memory buffer portion is reserved for the data migration activity in the source NVME SATA bridge drive 108. Before sending cold/hot/warm data notification to the NVME host 102, the source NVME SATA bridge drive 108 pre-fetches the number of LBAs in the core buffer and reserves the core buffer for data migration operation there by increasing the performance of data migration tasks.

The technology disclosed herein provides NVME framework that is built to satisfy the data migration process. The NVME Submission Queue and Completion Queue 150, 152 facilitates for data migration and notification. With the NVME Host 102 creating submission queue entries and monitoring completion queue entries for the data migration operation the NVME Host 102 fully controls the operation without its resources getting wasted for data migration activity. FIGS. 2-7 below illustrate host submission and completion queue creation and loading the respective commands for hot/cold data management.

Figure 2:
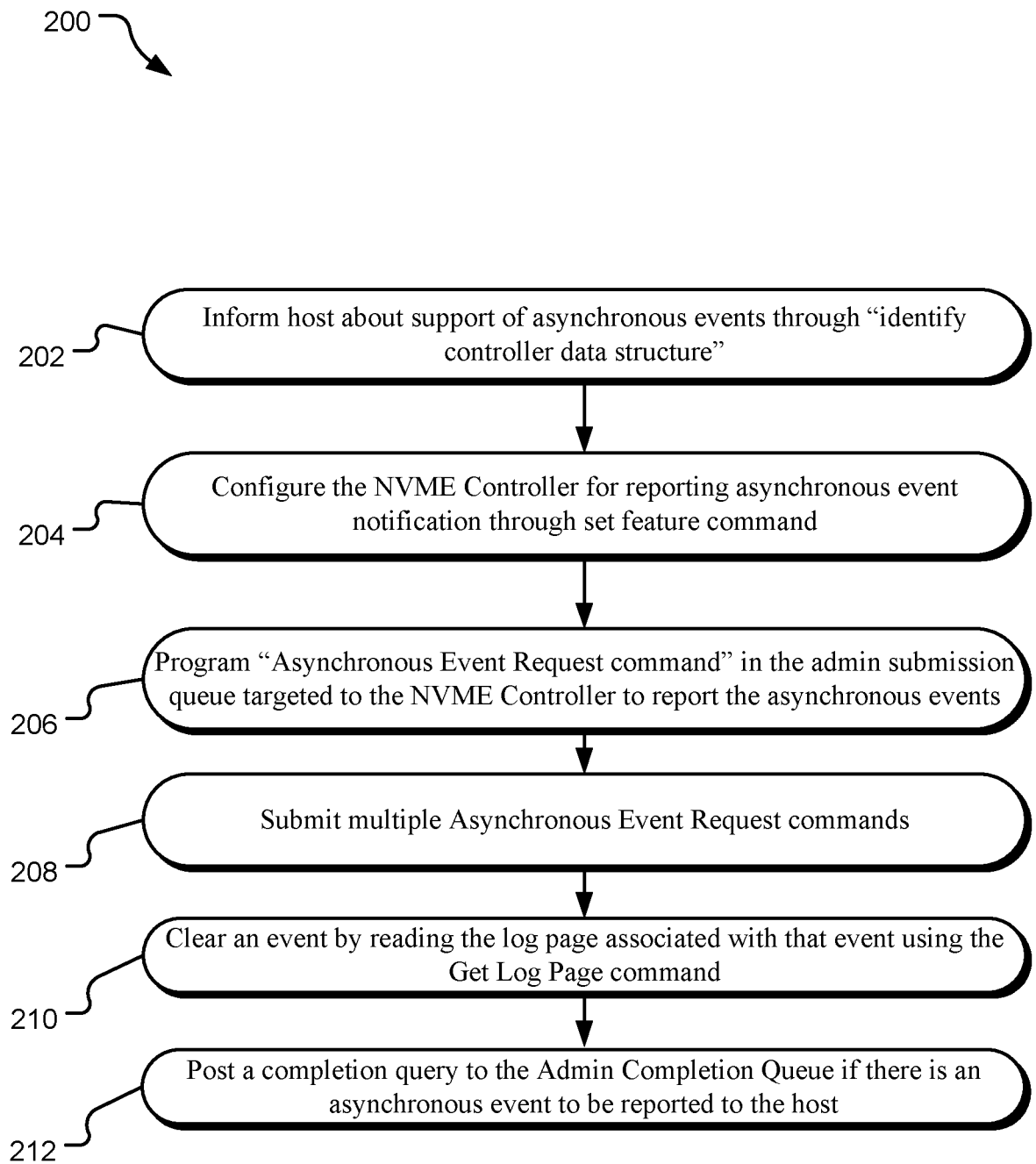
FIG. 2 illustrates example operations for programming and execution flow of Vendor Defined Asynchronous Event that further notifies the host about availability of "COLD/HOT/WARM cache condition.

FIG. 2 illustrates example operations for programming and execution flow of asynchronous events that further notifies the host about availability of "COLD/HOT/WARM cache condition. At operation 202 an NVME controller informs an NVME host about support of asynchronous events through an identify controller data structure. At operation 204 host configures the NVME controller for reporting asynchronous event notification through set feature command. Reporting about the cold/hot/warm cache condition is the asynchronous event. At operation 206 it further programs "Asynchronous Event Request command" in the admin submission queue targeted to the NVME Controller to report the vendor defined events. At operation 208 host software may submit multiple asynchronous event request commands. Maximum number of concurrently outstanding asynchronous event request commands supported by the controller is informed to the host through an "asynchronous event request limit" field in the identify controller data structure command. At operation 210 an event is cleared by reading the log page associated with that event using the get log page command. Subsequently, at operation 212 a completion queue entry is posted to the admin completion queue if there is an asynchronous event to be reported to the host.

Figure 3:
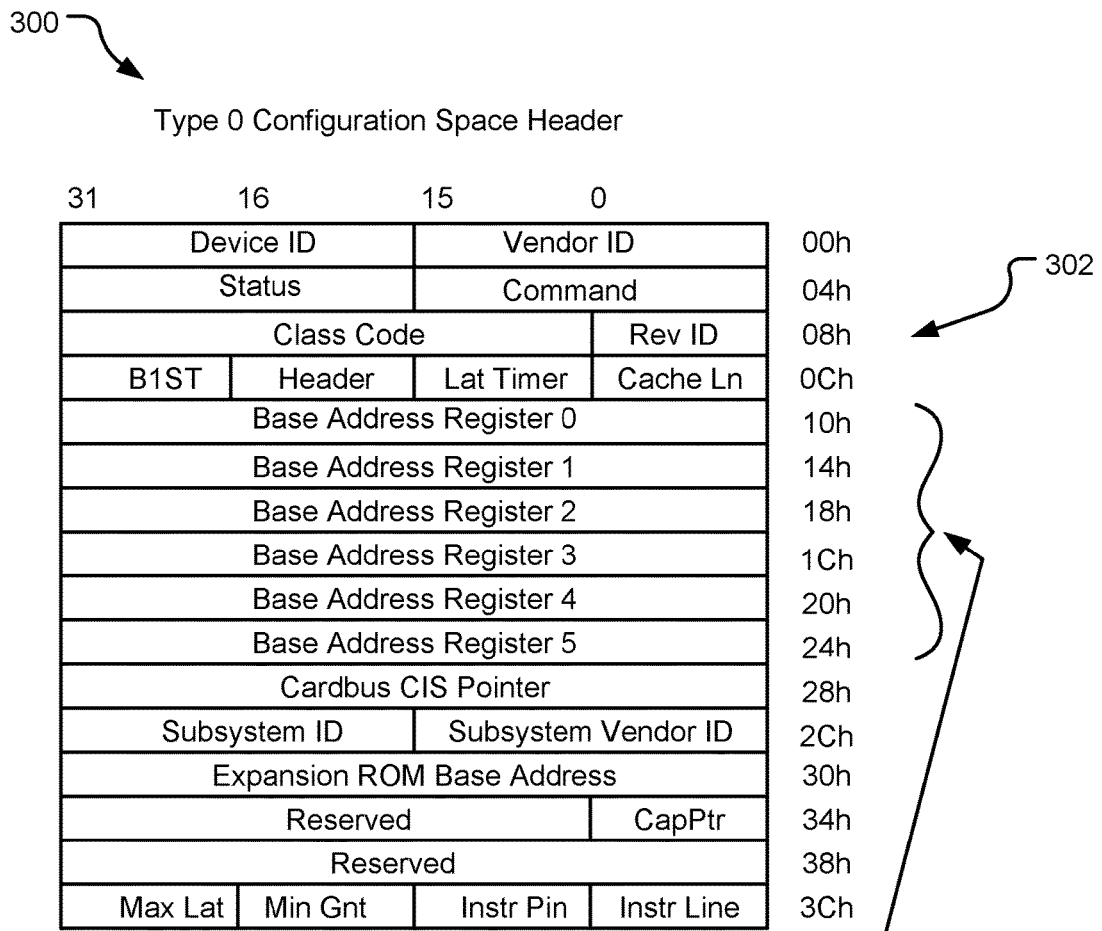
FIG. 3 illustrates example configuration of a PCIE configuration space header in NVME controller to expose controller memory buffer (CMB) as PCIe addressable Memory as disclosed herein.

FIG. 3 illustrates example configuration 300 of a space header 302 in NVME controller memory buffer (CMB) as disclosed herein. Specifically, the CMB may be a region of general purpose read/write memory on the controller that may be used for a variety of purposes. The use case of the controller memory buffer is specified by the controller by setting flag bits in "Controller Memory Buffer Size" register. In the case of data migration activity, the CMB may be used to pre fetch part of data to be migrated from NVM memory to core DDR memory. A host can then enable another drive to read the data from this core memory buffer to its own local storage via NVME command set point the host memory address to drive's local core memory buffer. The register details to use controller buffer memory feature are disclosed in FIG. 3. A controller memory buffer location register (CMBLOC) may be used to define the location of the CMB. A CMB Size Register is used to define size of controller buffer to store the data.

Figure 4:
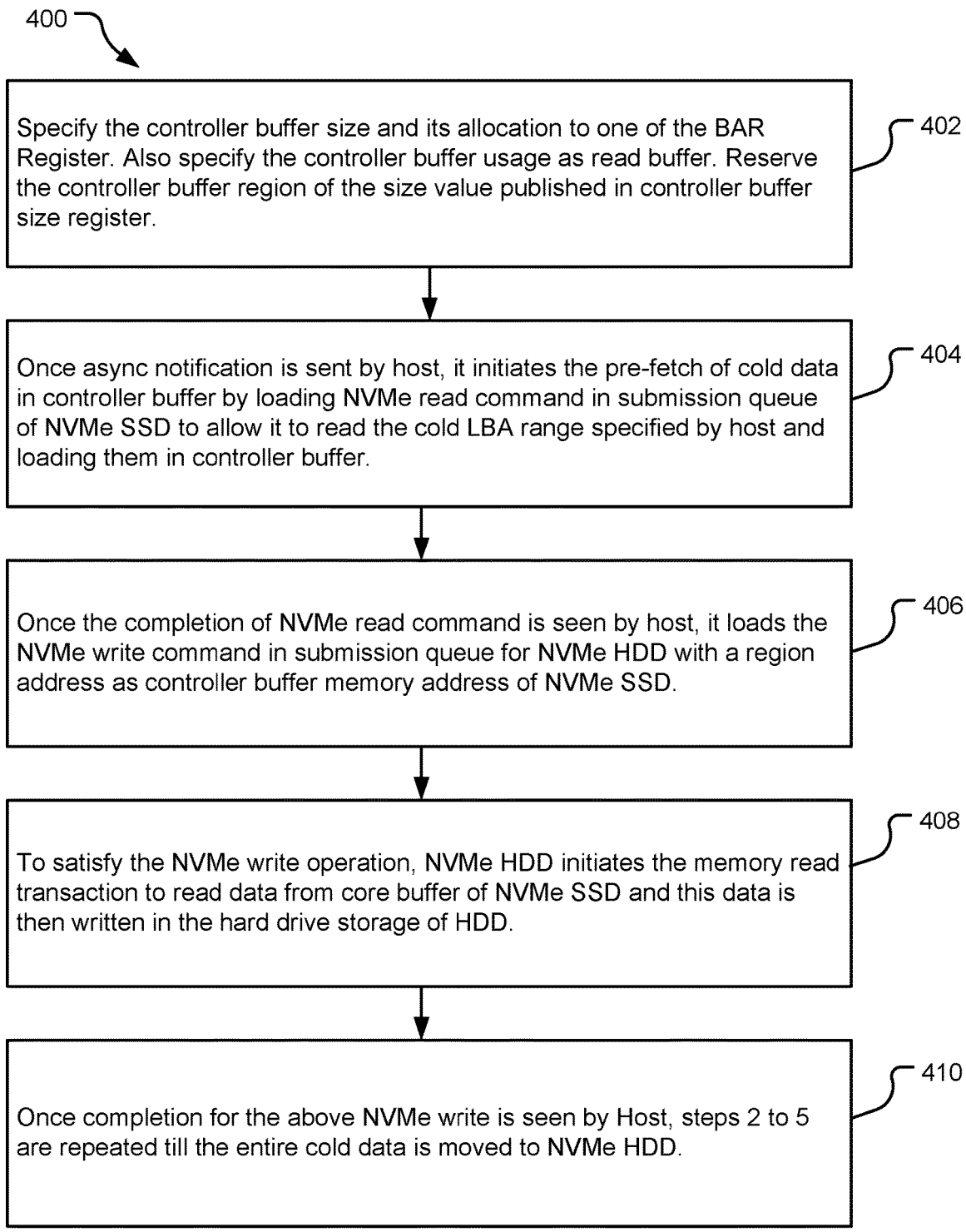
FIG. 4 illustrates example operations for cold data transfer using controller memory buffer (CMB) region as disclosed herein.

FIG. 4 illustrates example operations for cold data transfer using controller memory buffer (CMB) region as disclosed herein. Specifically, in data migration activity, the CMB is used for general read data transfers. The flow of data transfer using CMB is as described here in FIG. 4. Similarly, hot data transfer from NVME HDD to NVME SSD is done using CMB region of NVME HDD Controller. An operation 402 specifies the controller buffer size and its allocation to one of a base address register (BAR Register). The operation 410 also specifies the controller buffer usage as read buffer and reserves the controller buffer region of the size value published in controller buffer size register.

Subsequently, once an async notification is sent by the host, an operation 404 initiates the pre-fetch of cold data in controller buffer by loading the NVME read command in submission queue of NVME SSD to allow it to read the cold LBA range specified by host and load them in a controller buffer. Once the completion of NVME read command is seen by host, an operation 406 loads the NVME write command in submission queue for NVME HDD with a region address as controller buffer memory address of NVME SSD.

At operation 408, after satisfying the NVME write operation, the NVME HDD initiates the memory read transaction to read data from core buffer of NVME SSD and this data is then written in the hard drive storage of HDD. Once completion for the above NVME write is seen by host, at operation 410 the operations 402-408 are repeated until the entire cold data is moved to NVME HDD.

Furthermore, a method of expanding ROM space usage as disclosed herein that provides a workaround if there is no dedicated BAR region nor the CMB feature available for generic memory read operation. This is the case where most of the NVME drives implement the NVME 1.1 Specification.

Expansion ROM base address register (BAR) is part of PCIE configuration space. The host writes all ones (exception of bit zero) to the expansion ROM BAR register and then reads the register back. If a value of zero is returned, then the expansion ROM register is not implemented. If host is able to set any bits to ones indicates the presence of Expansion ROM BAR register. Host then assigns a base address to the BAR register's base address field, enables its decoder and then initiates the memory read transaction. The ROM is accessed during initial boot period. Once the boot operation is finished, the host can use the expansion rom space to initiate the memory read transactions for general purpose. Once the initialization code is executed from the ROM, host software disables the address decoder of rom bar region.

The same address space can be reused for HOT/COLD data transfer once the boot is finished using the set feature command as discussed earlier. In this case, the expansion ROM needs to be reserved for data migration activity. Before sending the asynchronous notification about cold/hot/warm data availability, the controller first pre-fetches the cold/hot/warm LBA portion in its local memory, which is mapped to ROM base address and when the memory read transaction is hit to this region, incremental reads are performed to load the data in core memory from the flash region (in case of cold data transfer) or from the HDD region (in case of warm/hot data transfer) to satisfy the data migration process.

Figure 5:
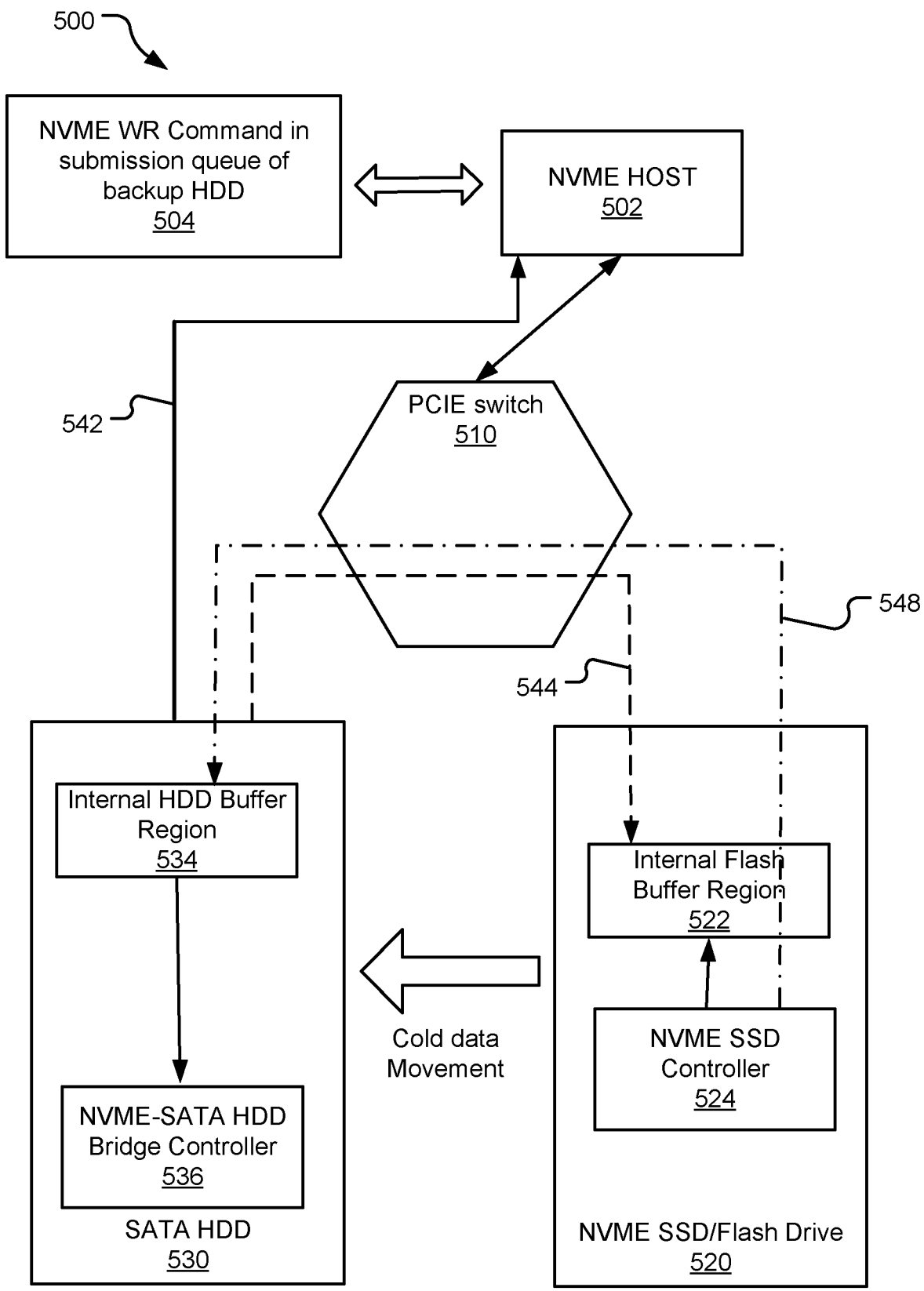
FIG. 5 illustrates example block diagram of PCIE data traffic flow for cold data management using a PCIE switch as disclosed herein.

FIG. 5 illustrates example block diagram of PCIE data traffic flow for cold data management using a PCIE switch 510 as disclosed herein. Specifically, the PCIE switch 510 is used to move cold data between a SATA HDD 530 and an NVME flash storage drive 520. The SATA HDD 530 may include an HDD path 532, an internal HDD buffer region 534, and an NVME-SATA HDD bridge controller 536. The NVME flash storage drive 520 may include an internal flash buffer region 522 and an NVME SSD controller 524. The PCIE switch 510 may also communicate with an NVME host 502.

At 542, an asynchronous request notification is sent to NVME host 502 about too cold data. In response, the NVME host 502 loads an NVME WR command 504 in the submission queue targeted for the NVME HDD drive 530 with a region address pointing to the internal flash buffer memory region 522 of NVME SSD/Flash drive. Subsequently, at 544 the NVME HDD drive 530 initiates a memory read transaction to read data from NVME SSD/Flash drive 520. The PCIE switch 510 matches a memory read transaction hitting the BAR space where the NVME SSD/Flash 520 is mapped and passes this transaction to the NVME SSD controller 524. In response to the memory read transaction, the NVME SSD Controller 524 fetches the data to be archived from NVME flash storage 520 and loads it in the internal flash buffer memory region 522. PCIE 510 completions are formed to satisfy the memory read transactions and at 548 data is further passed to NVME HDD Drive 530 through the PCIE switch 510. The HDD drive 530 loads this completion data into its internal HDD buffer region 534 and further pushes it into an LBA region specified in NVME WR command 504 as a backup data. The above-mentioned in FIG. 5 depict the cold data flow to the SATA HDD Drive 530.

Figure 6:
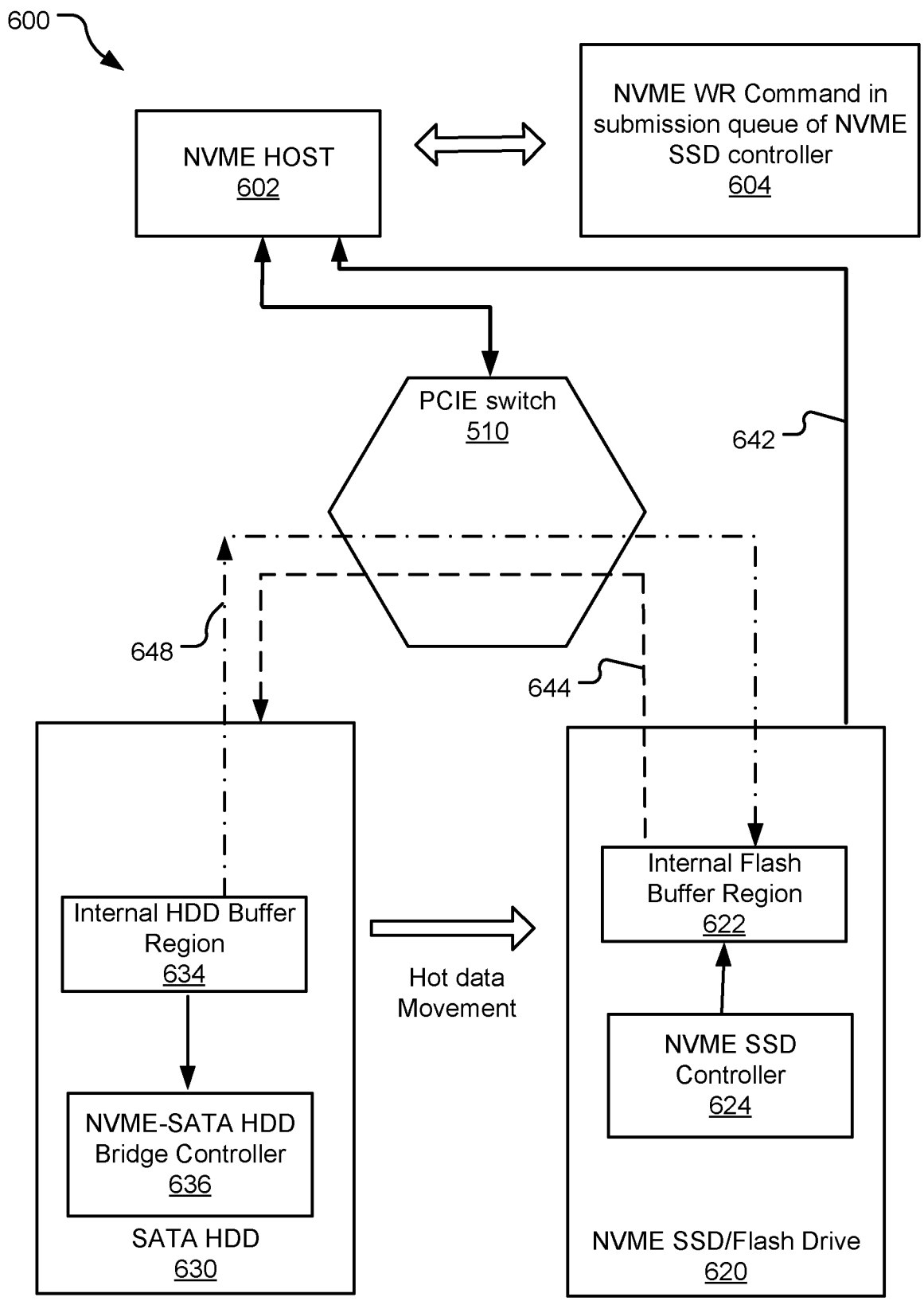
FIG. 6 illustrates example block diagram of peer-to-peer (P2P) PCIE data traffic flow for hot/cold data management using a PCIE switch as disclosed herein.

Whereas FIG. 6 illustrates example block diagram of peer-to-peer (P2P) PCIE data traffic flow for hot/cold data management using a PCIE switch 610 as disclosed herein. Specifically, the PCIE switch 610 is used to move cold data between a SATA HDD 630 and a n NVME flash storage drive 620. The SATA HDD 630 may include an HDD path 632, an internal HDD buffer region 634, and an NVME-SATA HDD bridge controller 636. The NVME flash storage drive 620 may include an internal flash buffer region 622 and an NVME SSD controller 624. The PCIE switch 610 may also communicate with an NVME host 602.

At 642, an asynchronous request notification is sent to NVME host 602 about too hot data. In response, the NVME host 602 loads an NVME WR command 604 in the submission queue targeted for the NVME SSD drive 620 with the a region address pointing to the internal flash buffer memory region 622 of NVME SSD/Flash drive 620. Subsequently, at 644 the NVME SSD/Flash drive 630 initiates a memory read transaction to read data from SATA HDD drive 630. The PCIE switch 610 matches a memory read transaction hitting the BAR space where the SATA HDD drive 630 is mapped and passes this transaction to the NVME SSD controller 624. In response to the memory read transaction, the NVME SSD Controller 624 fetches the data to be archived from NVME flash storage 520 and loads it in the internal flash buffer memory region 622. PCIE 610 completions are formed to satisfy the memory read transactions and at 648 data is further passed to NVME SSD/Flash drive 620 through the PCIE switch 610. The NVME SSD/Flash drive 620 loads this completion data into its internal Flash buffer region 634 and further pushes it into an LBA region specified in NVME WR command 604 as a backup data. The above-mentioned in FIG. 56 depict the hot data flow to the NVME Flash drive 620.

As disclosed in FIGS. 5 and 6, internal buffer memory regions 622 and 634 of the controllers are used for the data transfer. This buffer space can be mapped to expansion ROM region space of NVME SSD controller 624 or if the NVME SSD controller 624 supports the controller memory buffer (CMB) feature of NVME Specification then this region can be used for general purpose memory read/write transaction.

Figure 7:
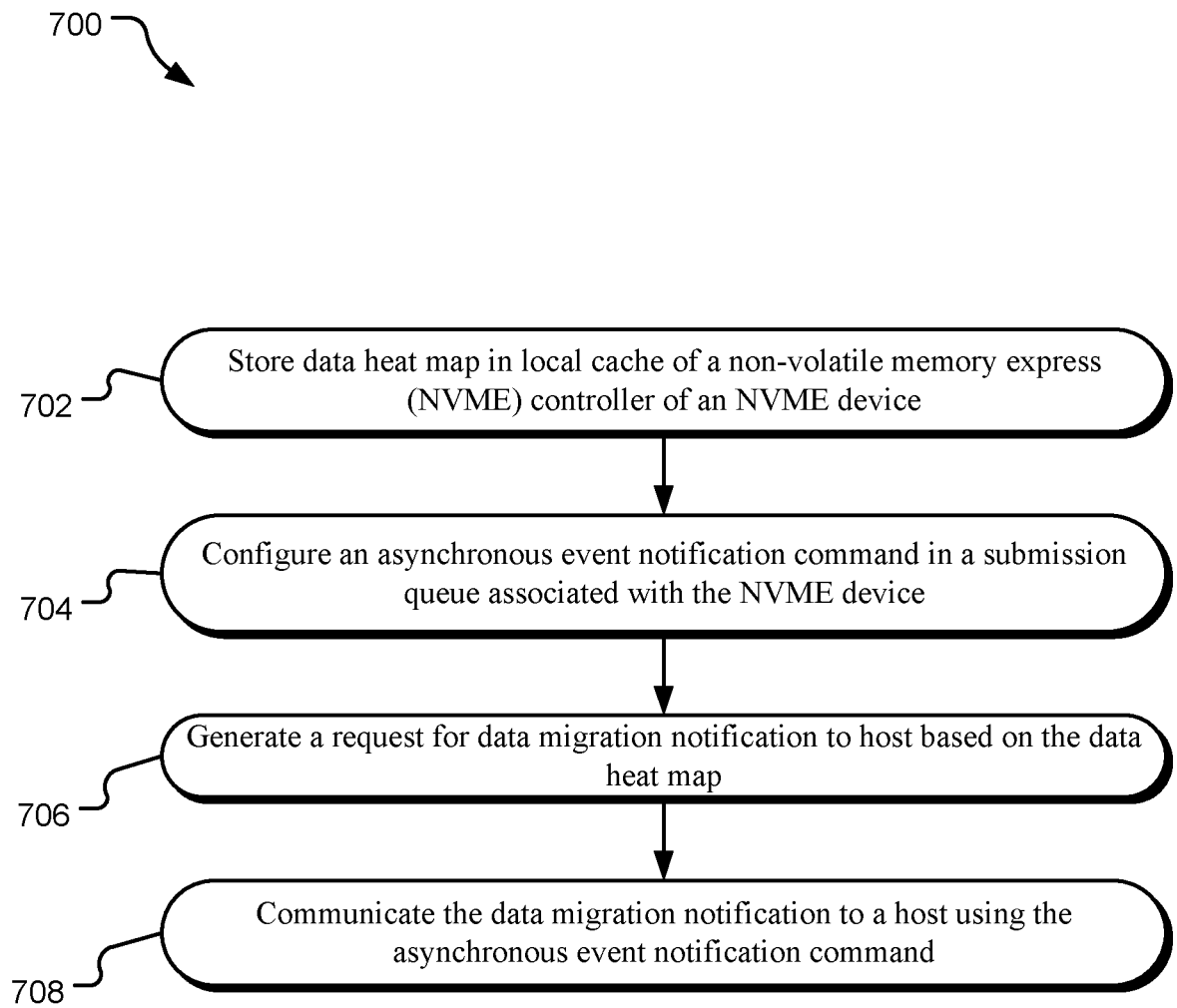
FIG. 7 illustrates example operations for offloading data migration between storage devices in a manner disclosed herein.

FIG. 7 illustrates example operations for offloading data migration between storage devices in a manner disclosed herein. An operation 702 stores a data heat map in local cache of a non-volatile memory express (NVME) controller associated with an NVME device. An operation 704 configures an asynchronous event notification command in a submission queue associated with the NVME device. An operation 706 generates a request for data migration notification to host based on the data heat map. Subsequently, an operation 708 communicates the data migration notification to a host using the asynchronous event notification command.

The technology disclosed herein provides the NVME system design implementation to migrate the data amongst different storage devices. NVME methodology and PCIE Interconnect played a vital role to build the communication between Host and NVME HDD/SSD and PCIE switch acted as an intelligent router to route the peer to peer data transfer transactions. The topology and methods implemented in the above article are cost effective solutions and grants the performance too that efficiently utilizes PCIE bandwidth.

Figure 8:
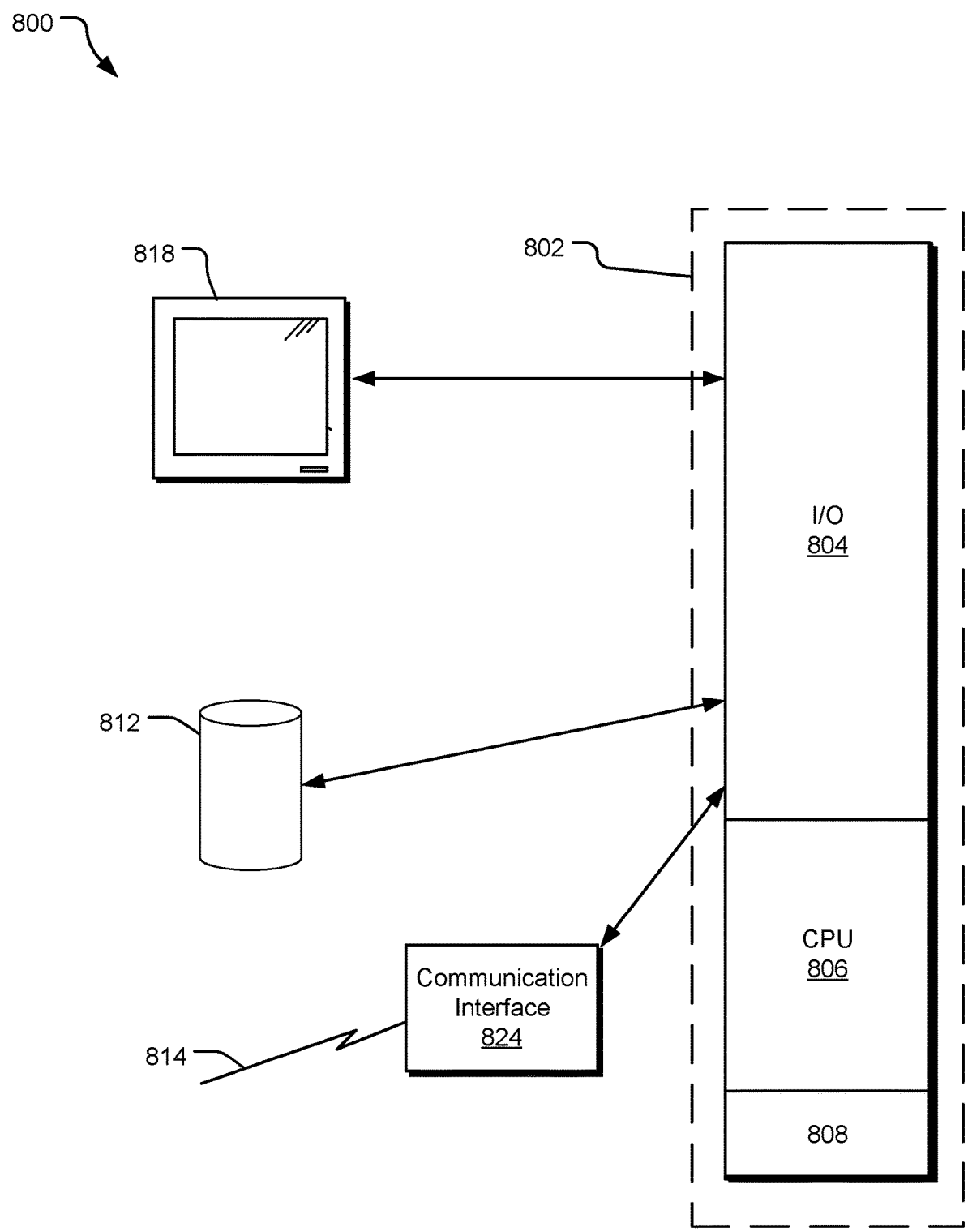
FIG. 8 illustrates an example processing system that may be useful in implementing the described technology

FIG. 8 illustrates an example processing system 800 that may be useful in implementing the described technology. The processing system 800 is capable of executing a computer program product embodied in a tangible computer-readable storage medium to execute a computer process. Data and program files may be input to the processing system 800, which reads the files and executes the programs therein using one or more processors (CPUs or GPUs). Some of the elements of a processing system 800 are shown in FIG. 8 wherein a processor 802 is shown having an input/output (I/O) section 804, a Central Processing Unit (CPU) 806, and a memory section 808. There may be one or more processors 802, such that the processor 802 of the processing system 800 comprises a single central-processing unit 806, or a plurality of processing units. The processors may be single core or multi-core processors. The processing system 800 may be a conventional computer, a distributed computer, or any other type of computer. The described technology is optionally implemented in software loaded in memory 808, a storage unit 812, and/or communicated via a wired or wireless network link 814 on a carrier signal (e.g., Ethernet, 3G wireless, 8G wireless, LTE (Long Term Evolution)) thereby transforming the processing system 800 in FIG. 8 to a special purpose machine for implementing the described operations. The processing system 800 may be an application specific processing system configured for supporting a distributed ledger. In other words, the processing system 800 may be a ledger node.

The I/O section 804 may be connected to one or more user-interface devices (e.g., a keyboard, a touch-screen display unit 818, etc.) or a storage unit 812. Computer program products containing mechanisms to effectuate the systems and methods in accordance with the described technology may reside in the memory section 808 or on the storage unit 812 of such a system 800.

A communication interface 824 is capable of connecting the processing system 800 to an enterprise network via the network link 814, through which the computer system can receive instructions and data embodied in a carrier wave. When used in a local area networking (LAN) environment, the processing system 800 is connected (by wired connection or wirelessly) to a local network through the communication interface 824, which is one type of communications device. When used in a wide-area-networking (WAN) environment, the processing system 800 typically includes a modem, a network adapter, or any other type of communications device for establishing communications over the wide area network. In a networked environment, program modules depicted relative to the processing system 800 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 808 and/or the storage unit 812 and executed by the processor 802. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 808 and/or the storage unit 812 and executed by the processor 802.

The processing system 800 may be implemented in a device, such as a user device, storage device, IoT device, a desktop, laptop, computing device. The processing system 800 may be a ledger node that executes in a user device or external to a user device.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it may be understood that logical operations may be performed in any order, unless explicitly claimed otherwise or unless a specific order is inherently necessitated by the claim language.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It may be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
   prefetching a logical block address (LBA) in a source controller memory buffer in a source non-volatile memory express (NVME) device and reserving the source controller memory buffer for data migration, wherein the LBA identifies a portion of storage media on the source NVME device that stores data to be migrated;
   receiving a request to migrate the data to be migrated from the source controller memory buffer to a target NVME device based on a data heat map stored in a local cache of an NVME controller configured to control operations of the source NVME device wherein the NVME controller and the local cache are components of the source NVME device; and
   transmitting, based on the received request, the data to be migrated from the source controller memory buffer of the source NVME device to the target NVME device, wherein the target NVME device is configured to point to an address of the source controller memory buffer, the transmitting of the data to be migrated using the address.

2. The method of claim 1, further comprising:
   determining a data temperature of the data to be migrated;
   storing the data temperature in the data heat map, wherein the prefetching is based on the determined data temperature; and
   transmitting an asynchronous command to an NVME host including one or more of the data temperature and an indication that the source NVME device is configured to migrate the data to be migrated based on the data temperature.

3. The method of claim 1, wherein the received request is received from a target device based on the address, the address being a region address pointing to the source controller memory buffer.

4. The method of claim 1, wherein transmitting the data to be migrated further comprising transmitting the data to be migrated via a peripheral component interconnect express (PCIE) switch.

5. The method of claim 1, further comprising:
   specifying controller memory buffer usage of the source controller memory buffer as a read buffer.

6. The method of claim 1, wherein the request to migrate data is received from the target NVME device operable to receive the transmitted data to be migrated, the method further comprising:
   determining that the data to be migrated is cold data, wherein the source NVME device is an SSD/Flash Drive and the target NVME device is an NVME SATA bridge drive.

7. The method of claim 1, wherein the request to migrate data is received from the target NVME device operable to receive the transmitted data to be migrated, the method further comprising:
   determining that the data to be migrated is hot data, wherein the target NVME device is an SSD/Flash Drive and the source NVME device is an NVME SATA bridge drive.

8. A storage device, comprising:
   a source non-volatile memory express (NVME) device including a source controller memory buffer and a hardware controller, the hardware controller operable to:
   prefetch a logical block address (LBA) to the source NVME device;
   reserve the source controller memory buffer for data migration, wherein the LBA identifies a portion of storage media on the source NVME device that stores data to be migrated;
   receive a request to migrate the data to be migrated from the source controller memory buffer to a target NVME device based on a data heat map stored in the source NVME device in a local cache of the hardware controller configured to control operations of the source NVME device; and
   transmit, based on the received request, the data to be migrated from the source controller memory buffer of the source NVME device to the target NVME device, wherein the target NVME device is configured to point to an address of the source controller memory buffer, the transmitting of the data to be migrated using the address to the source controller memory buffer.

9. The storage device of claim 8, the hardware controller further operable to:
   determine a data temperature of the data to be migrated;
   store the data temperature in the data heat map, wherein the prefetch is based on the determined data temperature; and
   transmit an asynchronous message to an NVME host including one or more of the data temperature and an indication that the source NVME device is configured to migrate the data to be migrated based on the data temperature.

10. The storage device of claim 8, wherein the received request is received from a target device based on the address, the address being a region address pointing to the source controller memory buffer.

11. The storage device of claim 8, wherein transmitting the data to be migrated further comprising transmitting the data to be migrated via a peripheral component interconnect express (PCIE) switch.

12. The storage device of claim 8, the hardware controller further operable to:
specify core buffer usage of the source controller memory buffer as a read buffer.

13. The storage device of claim 8, wherein the request to migrate data is received from the target NVME device operable to receive the transmitted data to be migrated, the hardware controller further operable to:
determine that the data to be migrated is cold data, wherein the source NVME device is an SSD/Flash Drive and the target NVME device is an NVME SATA bridge drive.

14. The storage device of claim 8, wherein the request to migrate data is received from the target NVME device operable to receive the transmitted data to be migrated, the hardware controller further operable to:
determine that the data to be migrated is hot data, wherein the target NVME device is an SSD/Flash Drive and the source NVME device is an NVME SATA bridge drive.

15. A physical article of manufacture including one or more tangible computer-readable storage media, encoding computer-executable instructions for executing on a computing device a computer process comprising:
prefetching a logical block address (LBA) in a source controller memory buffer in a source non-volatile memory express (NVME) device and reserving the source controller memory buffer for data migration, wherein the LBA identifies a portion of storage media on the source NVME device that stores data to be migrated;
receiving a request to migrate the data to be migrated from the source controller memory buffer to a target NVME device based on a data heat map stored in a local cache of an NVME controller configured to control operations of the source NVME device; and
transmitting, based on the received request, the data to be migrated from the source controller memory buffer of the source NVME device to the target NVME device, wherein a target NVME controller of the target NVME device is configured to point to an address to the source controller memory buffer, the transmitting of the data to be migrated using the address to the source controller memory buffer.

16. The physical article of manufacture of claim 15, the process further comprising:
determining a data temperature of the data to be migrated;
storing the data temperature in the data heat map, wherein the prefetching is based on the determined data temperature; and
transmitting an asynchronous message to an NVME host including one or more of the data temperature and an indication that the source NVME device is configured to migrate the data to be migrated based on the data temperature.

17. The physical article of manufacture of claim 15, wherein the received request is received from the target NVME device based on the address, the address being a region address pointing to the source controller memory buffer.

18. The physical article of manufacture of claim 15, wherein transmitting the data to be migrated further comprising transmitting the data to be migrated via a peripheral component interconnect express (PCIE) switch.

19. The physical article of manufacture of claim 15, the process further comprising:
specifying controller memory buffer usage of the source controller memory buffer as a read buffer.

20. The physical article of manufacture of claim 15, wherein the request to migrate data is received from the target NVME device operable to receive the transmitted data to be migrated, the process further comprising:
determining that the data to be migrated is cold data, wherein the source NVME device is an SSD/Flash Drive and the target NVME device is an NVME SATA bridge drive.

\* \* \* \* \*